United States Patent
Chatzis et al.

(10) Patent No.: US 12,362,822 B2
(45) Date of Patent: Jul. 15, 2025

(54) UNIFIED PLATFORM FOR NANOSATELLITE SYSTEMS

(71) Applicant: Endurosat Joint Stock Company, Sofia (BG)

(72) Inventors: Antonios Nikolai Chatzis, Sofia (BG); Milen Vasilev Naydenov, Sofia (BG); Georgi Vassilev Krachmariv, Sofia (BG); Philip Svetlozarov Dimitrov, Sofia (BG)

(73) Assignee: ENDUROSAT, Sofia (BG)

( * ) Notice: Subject to any disclaimer, the term of this patent is extended or adjusted under 35 U.S.C. 154(b) by 310 days.

(21) Appl. No.: 18/023,616

(22) PCT Filed: Feb. 11, 2021

(86) PCT No.: PCT/BG2021/000007
§ 371 (c)(1),
(2) Date: Feb. 27, 2023

(87) PCT Pub. No.: WO2022/082275
PCT Pub. Date: Apr. 28, 2022

(65) Prior Publication Data
US 2023/0327751 A1 Oct. 12, 2023

(30) Foreign Application Priority Data
Oct. 22, 2020 (BG) .......................... 113251

(51) Int. Cl.
*H04B 7/185* (2006.01)
(52) U.S. Cl.
CPC ................ *H04B 7/18515* (2013.01)

(58) Field of Classification Search
CPC ............................................ H04B 7/185–195
See application file for complete search history.

(56) References Cited

U.S. PATENT DOCUMENTS

| | | | | |
|---|---|---|---|---|
| 3,522,433 A | * | 8/1970 | Houghten | H04B 7/185 398/152 |
| 2009/0262018 A1 | * | 10/2009 | Vasilyev | G01S 19/235 342/357.62 |
| 2009/0296807 A1 | * | 12/2009 | Cloutman | H04N 5/913 375/E7.076 |
| 2017/0073087 A1 | * | 3/2017 | Clagett | B64G 1/36 |
| 2019/0089040 A1 | * | 3/2019 | Church | H01Q 1/288 |

FOREIGN PATENT DOCUMENTS

KR 2094139 B1 * 3/2020 ............... F03D 9/37

* cited by examiner

*Primary Examiner* — Raymond S Dean
(74) *Attorney, Agent, or Firm* — INVENTA CAPITAL GROUP

(57) ABSTRACT

This invention relates to unified platform for nanosatellite systems which will find application in the field of space technology and satellite communications. The created platform consists of communication buses, to which a power supply module, an on-board computer and a communication module including a UHF transceiver are bidirectionally connected. The platform also includes deployable solar panels, which are connected to the power supply module and to the attitude determination and control module, which is connected in both directions to the communication buses and. The on-board computer is also connected to additional interfaces. The communication module is bidirectionally connected to an antenna unit, including a UHF antenna, which is connected to the additional interface.

3 Claims, 1 Drawing Sheet

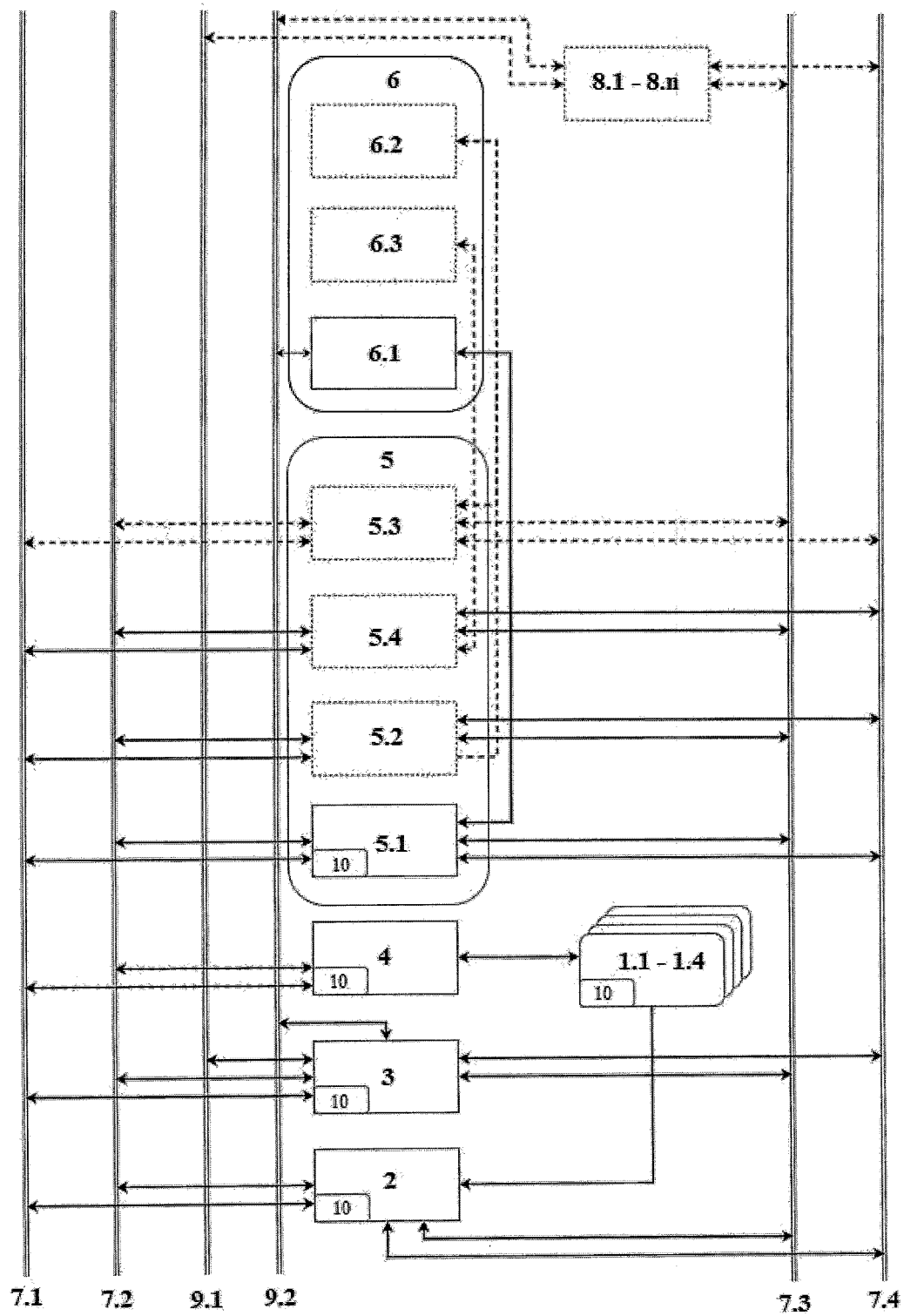

UNIFIED PLATFORM FOR NANOSATELLITE SYSTEMS

FIELD OF THE INVENTION

This invention relates to a unified platform for nanosatellite systems which will find application in the field of space technology and the satellite industry, and in particular for providing access from Earth to the payload of the platform, for performing tasks and/or commands sent from a ground station to the platform.

BACKGROUND OF THE INVENTION

Space exploration and related infrastructure are becoming increasingly important in today's world. The space sector is evolving at an extraordinary rate and this will lead to large-scale changes in many industries in the coming years. More than 7,000 new nanosatellites are expected to be launched worldwide in the next ten years.

Nanosatellites are increasingly used for Earth observation, for communication purposes, for information transfer, for research and training. According to experts, nanosatellites are more suitable and effective for activating the IoT (Internet of Things) network than larger satellites with outdated systems that cannot actually be updated. IoT is a network of all kinds of devices—from household machines to computers and even objects—with yet untapped digital potential. In the presence of network connectivity, they exchange information with each other without the need for human interaction. This requires a mobile network almost everywhere—a service that can best be provided by satellites and satellite platforms.

Satellite platforms are also used for broadcasting radio and TV programs, for remote work, for telemedicine, for online training, for servicing various industrial segments, including energy and transport—aviation, shipping, etc.

SUMMARY OF THE INVENTION

The objective of the invention is to create a unified platform for nanosatellite systems, which is autonomous, intelligent, secure and stable, providing both control of the satellite and communication between it and the ground station, and the ability to download and upload data to and from payload located on the platform.

The problem was solved by creating a unified platform for nanosatellite systems, which consists of communication buses, to which are connected in two directions power supply module, on-board computer and communication modules including as a minimum a UHF transceiver. The platform also includes expandable solar panels, which are unidirectionally connected to the power supply module and are bidirectionally connected to an attitude determination and control module, which is bidirectionally connected to the communication buses. The on-board computer is connected bidirectionally with additional interfaces. The communication module is bidirectionally connected to an antenna unit including a UHF antenna that is connected to the auxiliary interface.

The platform has the ability to include payloads, bidirectionally connected to both the communication buses and the additional interfaces. Each of the deployable solar panels, the power supply module, the on-board computer, the attitude determination and control module and the communication module are equipped with a redundant circuit.

In one embodiment, the communication module is capable of including both an S-band transmitter connected to an S-band receiver and/or additional high-speed radio frequency communication devices. The antenna unit is capable of including an S-band antenna, an X-band antenna and/or antennas for other frequencies. The S-band transmitter and S-band receiver are connected to the S-band antenna, and the additional high-speed radio frequency communication devices, which are of the type X-band transmitter, Ka-band transmitter, W/V-band transmitter, are connected to X-the band antenna and/or with the antennas for other frequencies.

The S-band transmitter, the S-band receiver and the additional high-speed radio frequency communication devices are connected bidirectionally to the communication buses.

The advantage of the unified platform for nanosatellite systems is that it provides access from Earth to the payload of the platform with very high level of redundancy which can operate even at a loss of up to 70% of resources, thanks to the unified communication structure built between all modules in the platform. Another advantage is that in each module a redundant circuit is implemented, with the help of which when the memory of a microcontroller is completely erased due to radiation damage, the main part of its memory is restored, thus the microcontroller completely self-recovers and/or reprograms.

BRIEF DESCRIPTION OF THE FIGURES

This invention is illustrated in the attached FIG. 1, which is a schematic diagram of a unified platform for nanosatellite systems according to the invention.

DETAILED DESCRIPTION OF EMBODIMENT OF THE INVENTION

The created unified platform for nanosatellite systems, shown in FIG. 1, consists of communication buses 7.1, 7.2, 7.3 and 7.4, to which bidirectionally power supply module 2, on-board computer 3 and communication module 5, including UHF transceiver 5.1 are connected. The platform also includes deployable solar panels 1.1 ... 1.4, which are unidirectionally connected to the power supply module 2 and are unidirectionally connected to the attitude determination and control module 4, which is bidirectionally connected to the communication buses 7.1 and 7.2. The on-board computer 3 is connected bidirectionally with additional interfaces 9.1 and 9.2. The communication module 5 is bidirectionally connected to an antenna unit 6 comprising a UHF antenna 6.1, which is connected to the additional interface 9.2.

The platform has the ability to include payloads 8.1 ... 8.n, bidirectionally connected with the communication buses 7.3 and 7.4, as well as with the additional interfaces 9.1 and 9.2. Each of the deployable solar panels 1.1 ... 1.4, the power supply module 2, the on-board computer 3, the attitude determination and control module 4 and the communication module 5 are provided with a redundant circuit 10.

In one embodiment, the communication module 5 is capable of including both an S-band transmitter 5.2 connected to an S-band receiver 5.3 and/or additional high-speed radio frequency communication devices 5.4. The antenna unit 6 is capable of including an S-band antenna 6.2, an X-band antenna 6.3 and/or antennas for other frequencies. S-band transmitter 5.2 and S-band receiver 5.3, are connected to the S-band antenna 6.2, and the additional high-speed radio frequency communication devices 5.4, which are of the type X-band transmitter, Ka-band transmitter, W/V-band transmitter, are connected to the X-band antenna 6.3 and/or to antennas for other frequencies.

The S-band transmitter 5.2, the S-band receiver 5.3 and the additional high-speed radio frequency communication devices 5.4 are bidirectionally connected to the communication buses 7.1, 7.2, 7.3 and 7.4. The modules of the created unified platform for nanosatellite systems have the following functions and characteristics:

Deployable solar panels 1.1 ... 1.4 convert solar energy into electricity, which is fed to the input of power supply module 2. Solar panels 1.1 ... 1.4 consist of solar cells, light sensors, gyroscopes, microcontrollers and connectors.

The power supply module 2 consists of input power converters from the solar panels, charger, balancing device, batteries, heating element, output power converters. The power supply module 2 provides power supply for all modules of the platform, distributing the power received from the solar panels 1.1-1.4 so that it has suitable electrical parameters for the power supply of modules with different voltage levels. Part of the energy is stored in the batteries of the power supply module 2.

The on-board computer 3 is a module on which the main part of the platform software is executed. It is responsible for the main modes of operation of the entire platform. The on-board computer 3 consists of four microcontrollers—two main dual-core and two acting as a programming device for the first two, connectors, external memory and two memory card slots.

The attitude determination and control module 4 is responsible for correctly pointing the satellite into desired orientations relative to the Earth and other reference objects. It consists of a control board with a main microcontroller, a board with actuating devices (reaction wheels) and a board with sensors—two cameras, magnetic field sensors and high-precision light sensors.

Communication module 5 must include a UHF transceiver 5.1 for basic connection and control of the satellite from Earth. The UHF transceiver 5.1 maintains a low speed—20 Kbps, and does not require pointing to the Earth. It consists of connectors, microcontroller and radio circuit.

The communication module 5 is able to include an S-band transmitter 5.2, which maintains a higher speed downlink—5 Mbit/s and is used to transmit larger data and telemetry from the satellite to Earth. S-band transmitter 5.2 consists of connectors, microcontroller, two memory card slots, modulator, radio circuit. Communication module 5 may also include an S-band receiver 5.3, which also supports a higher speed uplink—5 Mbps and is used to upload larger files, such as files for new software for the platform modules and to control the satellite from the Earth. It consists of connectors, microcontroller, two memory card slots, demodulator, radio circuit. The communication module 5 has the possibility to include other additional high-speed radio frequency communication devices 5.4 such as X-band transmitter, Ka-band transmitter, W/V-band transmitter, etc. They maintain a high data rate from satellite to Earth from 150 Mbps to several Gbps, in different bands of the radio frequency spectrum. They serve to quickly transfer a large amount of information from the satellite to Earth such as photos and/or video. They consist of connectors, microcontrollers, two memory card slots, digital part for modulator signal generation, radio circuit.

The antenna unit 6 necessarily includes a UHF antenna 6.1, which consists of a mechanical frame, a board with a microcontroller for control and connectors, as well as metal antennas with a mechanism for their deployment.

The antenna unit 6 is capable of including an S-band antenna 6.2, an X-band antenna 6.3 and/or antennas for other frequencies, which consist of a board with separate metal patches and a connector. The antennas are part of the necessary infrastructure for the operation of the communication devices from the communication module 5 and, respectively, where any of the frequencies is not required (S-band, X-band, Ka-band, etc.), the respective antenna is not placed.

Communication buses 7.1, 7.2, 7.3 and 7.4 ensure the exchange of data both between all modules of the platform and with external modules, where there are additional restrictions on the security of the platform. The buses 7.1, 7.2, 7.3 and 7.4 provide a total of 4 communication channels; the communication buses 7.1 and 7.2 are system buses, which are available only for the platform modules, and the communication buses 7.3 and 7.4 are also for payload, i.e. in addition to the platform modules, payloads 8.1 ... 8.*n* are also connected to them. Communication buses 7.1, 7.2, 7.3 and 7.4 are quadruple reserved, supporting both high and low data exchange speeds between all modules. They are suitable for both control and data exchange. Also, a mechanism has been implemented in the platform, such that, when a fault is detected in one of the buses, it transfers the communication to the next functioning bus and the data exchange continues, without affecting the general condition of the platform.

The payload 8.1 ... 8.*n* is a third-party client device that is a means of exploring the Earth from space, exploring the space environment, or a device for measuring and/or experimenting in orbit. The payload 8.1 ... 8.*n* may be a photo and video camera, an infrared camera, a communication module with a radio or optical connection to the Earth and/or another satellite. It can also be any type of electronics, mechanism or other type of cargo that is subject to study in space.

Additional interfaces 9.1 and 9.2 are used to connect the payload 8.1 ... 8.*n* and the platform, in which case the load stability is reduced. UART, I2C, SPI interfaces are supported. The redundant circuit 10 is a control and monitoring circuit consisting of two pairs of microcontrollers—two main and two auxiliary. The main microcontrollers have completely interchangeable functions, and in case of a defect of one of the two, the other takes over its functions 100%. Auxiliary microcontrollers have radiation-resistant memory and play the role of an external programming device for the respective main microcontroller. In case of deleting and/or changing the memory of the main microcontroller, the auxiliary microcontroller can restore it.

This functionality of recovery and/or reprogramming of the main microcontroller is not limited only to the local level in the respective module. This function can also be applied from one module to another, ie. a main and/or auxiliary microcontroller of one module may reprogram a main and/or auxiliary microcontroller located in another module via communication buses 7.1, 7.2, 7.3 and 7.4.

The functionality of the platform is as follows: Immediately after separation of the platform from the carrier in orbit, the power supply unit 2 is activated to activate the power supply of all modules of the platform. Then a signal is sent to each module to turn it on. Up to 30 minutes after separation, depending on the orbit, a signal is sent from the on-board computer 3 to open the UHF antenna 6.1 and the solar panels 1.1-1.4. The system for stabilizing the orienta tion of the platform is activated by means of the on-board computer 3 and the module for determining and controlling the attitude 4. The communication module 5 enters the mode by sending a platform-specific signal via the UHF transceiver 5.1 in certain intervals, which can be intercepted by the ground station. After establishing a connection with the platform, it enters a normal mode of operation, during which the tasks provided for a mission and/or commands sent from the ground station to the platform are performed.

In each of the modules that make up the platform, software and hardware level logic is implemented, which provides the autonomous functionality of the platform. The platform estimates on the basis of basic and critical indicators of the subsystems, deciding which mode of operation is the most effective or adequate for a given moment.

The intelligence of the platform is that, depending on the tasks assigned by the ground station, the platform pre-plans when different processes should be started in preparation for the task. This includes operations such as: the correct orientation of the satellite, obtaining the necessary energy, pointing and activating the payload—camera, radio, experiment, etc.

The security of the platform lies in the fact that all radio channels for communication with the nanosatellite are encrypted. This allows more than one payload to be deployed to different customers and each customer to have access to only their payload.

This is possible thanks to the architecture of the platform providing "functionality sharing", as well as the unified communication structure built between all modules in the platform. This means that when one module is damaged, then other module(s) will cover some of its functions. In addition, each module has an implemented programmer, which, when the microcontroller's memory is completely erased due to radiation damage, is able to restore the main part of its memory, thus the microcontroller can self recover to a fully functional state.

The invention claimed is:

1. An unified platform for nanosatellite systems, comprising:
communication buses to which a power supply module, an on-board computer and a communication module are bidirectionally connected, a UHF transceiver, the platform also includes deployable solar panels, which are unidirectionally connected to the power supply module and are bidirectionally connected to the attitude determination and control module, which is bidirectionally connected to the communication buses and, where the on-board computer is bidirectionally connected to additional interfaces and, and the communication module is bidirectionally connected to an antenna unit, including a UHF antenna, which is connected to the additional interface, the platform is capable of including payloads, bidirectionally connected to both the communication buses and, and with the additional interfaces and, and each of the deployable solar panels, the power supply module, the on-board computer, the attitude determination and control module and the communication module are equipped with a redundant circuit.

2. The unified platform for nanosatellite systems according to claim 1, wherein the communication module is capable of including both an S-band transmitter connected to an S-band receiver and/or additional high-speed radio frequency communication devices, where the antenna block is capable of including an S-band antenna, an X-band antenna and/or antennas for other frequencies, and the S-band transmitter and the S-band receiver are connected to the S-band antenna, and the additional high-speed radio communication devices, which are of the X-band transmitter type, Ka-band transmitter, W/V-band transmitters, are connected to the X-band antenna and/or to the antennas for other frequencies.

3. The unified platform for nanosatellite systems according to claim 2, wherein the S-band transmitter, the S-band receiver and the additional high-speed radio frequency communication devices are bidirectionally connected to the communication buses.

* * * * *